Sept. 14, 1926. 1,599,907
W. MACGREGOR
SWING JOINT
Filed July 20, 1925
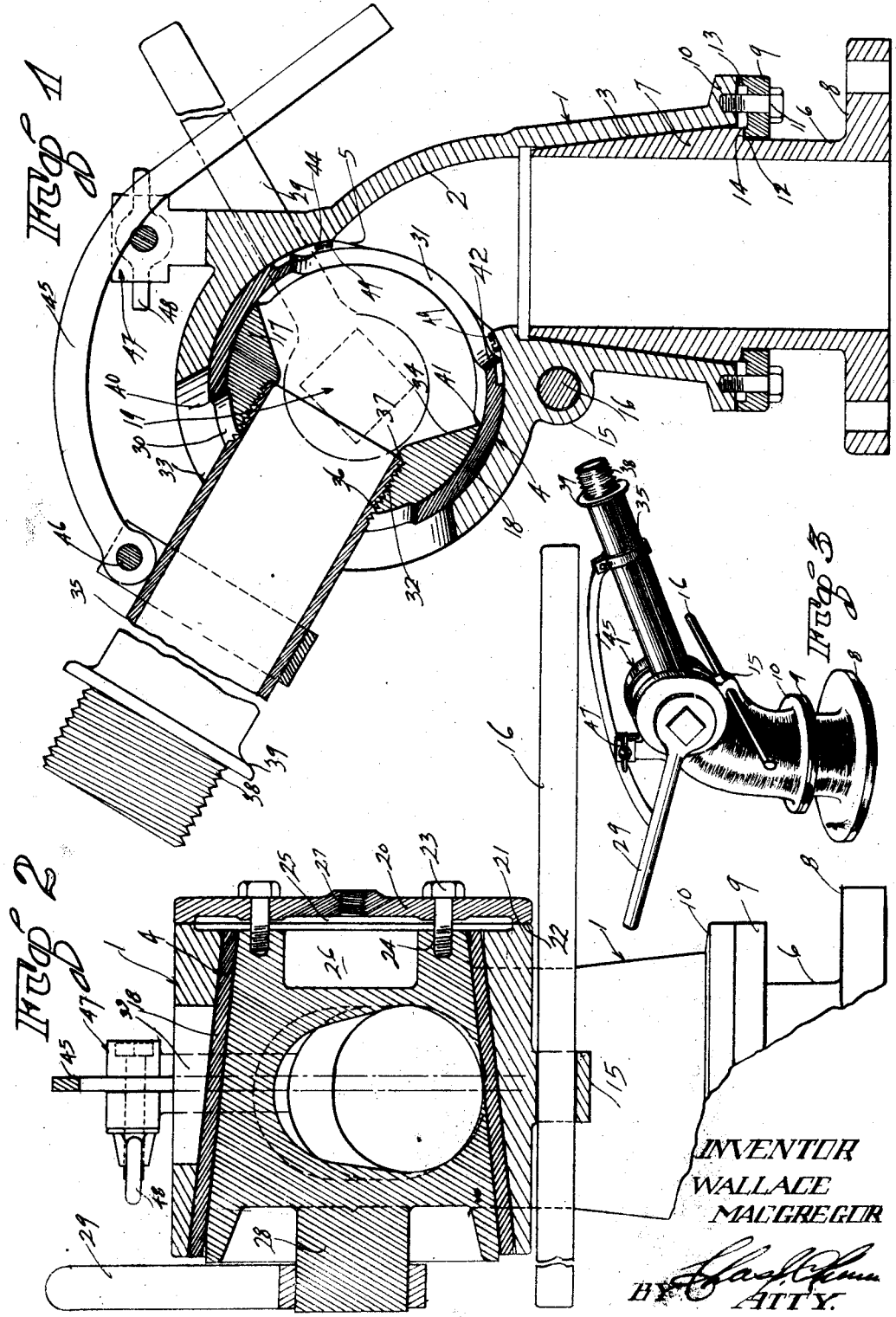
INVENTOR
WALLACE
MACGREGOR
BY
ATTY.

Patented Sept. 14, 1926.

1,599,907

UNITED STATES PATENT OFFICE.

WALLACE MACGREGOR, OF BERKELEY, CALIFORNIA.

SWING JOINT.

Application filed July 20, 1925. Serial No. 44,742.

This invention relates to an improved joint for coupling one pipe to another so that one of the pipes may be moved freely in horizontal and vertical planes and the joint is therefore made particularly adaptable for use in connection with fire hydrants, although it may be put to other uses as well.

One of the objects of the invention is to provide a joint of the character described in which the joint members are so constructed and arranged that there is little or no obstruction to the free flow of liquid through the joint.

Another object of the invention is to provide an improved joint of the character described which is free from packing, there being especially constructed and arranged joint members providing a metal to metal bearing and insuring a leak-proof joint which is suitable for use in conducting liquids under high pressure, and in great volume.

Another object of the invention is to provide a point of the character described which has an especially constructed floating metal sleeve arranged to provide for an effective and comparatively large bearing area between the joint members regardless of the relative positions of said joint members whereby a tight and leak-proof joint is provided for and free movement of the joint members is insured.

A further object of the invention is to provide a joint of the character described which when used in connection with fire hydrants and the like wherein water under high pressure is passed through the joint to a nozzle, will permit of an easy and effective manipulation of the nozzle by a single attendant or operator.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a vertical sectional view of the joint of my invention as when it is used in connection with a fire hydrant.

Fig. 2 represents a sectional view with the joint taken on the plane of line 2—2 of Fig. 1.

Fig. 3 represents a perspective view of the joint of the invention as applied to a fire hydrant.

The embodiment of the invention shown in the accompanying drawing is incorporated with a fire hydrant and is constructed so that the nozzle attached to one of the joint members is capable of a 360° movement in a horizontal plane and a 75° movement in a vertical plane, provision being made for a 10° movement vertically below the horizontal and a 65° movement vertically above the horizontal. However, these extents of adjustment may be varied as desired dependent upon the use to which the joint of the invention is to be put. Essentially the joint is adapted for connecting a stationary pipe and a movable pipe, or better, connecting a pipe which is to be swung both horizontally and vertically with a pipe which is to be fixed.

The joint comprises a somewhat T-shaped casing generally designated 1, the head portion of which casing is open at both ends and the shank portion of which is open at its lower end, there being a short curved passage 2 joining the head and shank portions. At the lower end of the shank portion of the casing is a frustro-conical seat 3 and in the head portion of the casing is a frustro-conical seat 4 which is disposed at right angles to the seat 3, the seat 3 having its longitudinal axis disposed in a vertical plane and the seat 4 having its longitudinal axis disposed in a horizontal plane. The seat 4 is provided between its ends with an opening 5 which permits of communication of the interior of the head portion of the casing with the upper end of the passage 2.

A tubular joint member 6 is adapted to extend into the lower end of the casing 1 and is provided with a frustro-conical portion 7 adapted to bear upon the frustro-conical seat 3. The joint member 6 is provided at its outer end with an annular laterally extending flange 8 which provides for fastening the joint member to a stationary pipe or conduit, not shown. A sectional clamping ring 9 is arranged to surround the joint member 6 and is removably fastened to a flange 10 on the lower end of the casing by means of screw bolts 11. The inner face of the ring 9 is provided with annular projections 12 and 13. The projection 12 is adapted to engage upon the annular shoulder 14 defined at the outer end of the frustro-conical portion 7 and the projection 13 is adapted to engage upon the flange 10. The lower end of the casing 1 having the seat 3 and the tubular bearing member 6 with its frustro-conical portion 7 and means for holding the two members together, comprises a swing joint of the type embodied in my U. S. Letters Patent No. 1,509,562, granted Sept. 23, 1924, for rotatable pipe joint. This joint arrangement provides for free rotation of the casing 1 on the tubular joint member 6, through 360° horizontally. The casing is provided with an apertured ear 15 adapted to have a handle 16 inserted through it, which handle provides for turning of the casing 1. The lower joint is free from packing, the metal to metal bearing being such as to insure a leak-proof joint in all conditions of use thereof.

The upper joint is of special construction to provide for the connection with the casing 1 of a pipe or nozzle which is to be moved vertically, for example a fire nozzle. This upper joint comprises a frustro-conical horizontally disposed joint member 17 mounted in the head portion of the casing 1 and which is surrounded by and has a working fit in a frustro-conical floating sleeve 18. The sleeve has a working fit against the frustro-conical seat 4 and one of its purposes is to compensate for the loss of bearing area caused by providing a relatively large transverse passage 19 through the bearing member 18. The bearing member 17 and sleeve 18 are held in place by means of a clamping plate 20 which has on its inner face an annular projection 21 adapted to engage a similar annular projection 22 on one end of the head of the casing 1. By means of screws 23 which are inserted through the plate 20 and turned into screw threaded openings 24 in the smaller end of the frustro-conical member 17, the plate is removably held in place. The projections 21 and 22 space the plate 20 from the adjacent end of the casing 1 and member 17 and define a lubricant chamber 25 which is in communication with a lubricant pocket 26 formed in the smaller end of the member 17. The plate has an opening 27 which provides for the attachment of a grease cup, not shown, to supply lubricant to the pocket 26 and chamber 25. Lubricant will be directed from the chamber 25 so as to lubricate the working faces of the member 17, sleeve 18 and the seat 4. To adjust the member 17 and sleeve 18 to compensate for wear, the plate 20 may be removed and the projection 21 filed away, following which the plate is fitted back in place, and the screws 23 tightened to bring the parts into proper seat with one another.

At the other end of the member 17 is a squared projection 28 on which an operating lever 29 is removably mounted. On movement of this lever 29, the member 17 is turned.

The sleeve 18 is provided on opposite sides with vertically elongated openings 30 and 31. The opening 30 registers with the screw threaded cylindrical portion 32 of the transverse passage 19 and with an elongated opening 33 provided in the head portion of the casing 1. The passage 19 is flared and enlarged as at 34, at the end thereof which registers with the opening 5. The opening 5 is of less length or diameter vertically, than the opening 31 and the flared or enlarged end 34 of the passage 19 is of greater length or diameter vertically than the opening 31, and the opening 33 is of considerably greater length or diameter vertically, than the opening 30, to insure free flow at all positions of joint.

A short pipe or what might be termed a tubular connecting member 35, has an externally threaded inner end 36 which is screwed into the opening 32, the end of this pipe being screwed tight against the shoulder 37 provided at the inner end of the screw threaded opening 36. The pipe projects through the openings 30 and 33 and on turning of the member 17 is permitted free vertical movement in said openings 30 and 33. On its outer end the pipe 35 is provided with screw threads 38 and an annular flange 39 whereby a fire nozzle or other pipe or conduit which is to be moved with the pipe 35, may be connected thereto.

The formation of the large intake end 34 of the passage 19 decreases the bearing area of the member 17 and if said member 17 were permitted to bear upon the seat 4, the reduced bearing area would probably be insufficient to prevent leakage. For this reason the sleeve 18 is employed, said sleeve serving to increase the bearing area so that the joint will be leak-proof at all times, in all positions of adjustment. When the pipe 35 is in the position shown in Fig. 1 and is subject to movement of an equal extent both upwardly and downwardly, on manipulating the lever 29 to rotate the member 17 in a clockwise direction, the pipe 35 will be elevated. If the frictional engagement between the members 17 and 18 is insufficient to cause the latter to move, the pipe 35 will engage the sleeve 18 at the upper end 40 of the opening 30, before the pipe 35 has been moved upwardly to its full extent, and thereby causes the sleeve 18 to rotate as does the member 17. This movement of the member 17 brings the lower side 41 of the passage 19 close to the lower side of the opening 33 of the casing 1 and moves the lower end or side 42 of the opening 31 but slightly towards the end 41 and this leaves a tial portion as an extension of the bearing face on the lower side of the member 17, making a comparatively large bearing face between the seat 4 and member 17 to insure against leakage. The upper end 44 of the opening 31 does not move past a point in registration with the upper end of the opening 5 when the member 35 is moved upwardly to its maximum extent and therefore no obstruction to the free passage of liquid through the passage 19 is provided. On the lowering of the member 35 the reverse operation takes place.

To provide for holding the pipe 35 in adjusted position an arcuate guide member 45 is pivoted as at 46 on the member 35 and passes through a friction clamp 47 provided on the casing 1. On loosening the screw 48 forming a part of the clamp 47, the member 45 will slide freely through the clamp, the screw 48 being tightened to hold the member 45 and pipe 35 in adjusted position.

The two joint members arranged at right angles to one another and connected by an unobstructed passage, both joints being free from packing and providing metal to metal bearing faces, provide a reliable, compact and efficient swing joint device for coupling pipes or the like together so that one of the pipes may be moved in both horizontal and vertical planes as, for example, as is required in fire hydrants. This construction is particularly adapted for fire hydrants in that one man may easily move the nozzle and by means of the friction clamp 36, may clamp the nozzle in any position to which it may be adjusted.

The construction of the joint is such that there may be provided a comparatively large intake opening in the joint member 17 in order to prevent obstruction to the free passage of liquid through the joint member, without sacrifice as to the bearing area of the joint members. The registering openings through the various elements of the upper joint may be of the same diameter in a horizontal plane but must be made of different diameters in a vertical plane to provide for the advantages hereinbefore described. The unobstructed passages of the joint prevent swirling of the liquid as it passes through the joint and thereby prevent resistances being set up which would retard free flow and interfere with the free movement of the joint member.

One of the advantages of the invention resides in the provision for ready and easy adjustment of the parts to compensate for wear thereon. The adjustment necessary to compensate for wear on the parts does not require the complete disassembling of the apparatus, partial disassembling only being necessary.

To prevent the floating sleeve from moving into a position such that the sleeve would prevent the free flow of liquid through the joint, stops 49 are provided adjacent the upper and lower extremities of the opening 5 in the casing 1.

I claim:

1. A joint of the character described comprising a casing having spaced openings, a tubular joint member engaged with the casing, registering with one of said openings and adapted for connection with a pipe or conduit, a joint member rotatably mounted within the casing and having a passage extending transversely therethrough between its ends, which passage is in registration with said openings in the casing, a sleeve having a working fit interiorly of the casing and within which sleeve said rotatable joint member has a working fit, which sleeve is provided with openings on opposite sides thereof between its ends, which openings are in registration with the first named openings and a tubular member carried by the rotatable joint member with one end thereof in registration with the passage in the joint member, said tubular member extending outwardly through certain registering openings in the sleeve casing.

2. A joint of the character described comprising a casing having spaced openings, a tubular joint member engaged with the casing, registering with one of the openings and adapted for connection with a pipe or conduit, a joint member rotatably mounted within the casing and having a passage extending transversely therethrough between its ends, which passage is in registration with said openings in the casing, a sleeve having a working fit interiorly of the casing and within which sleeve said rotatable joint member has a working fit, which sleeve is provided with openings on opposite sides thereof between its ends, which openings are in registration with the first named openings and a tubular member carried by the rotatable joint member with one end thereof in registration with the passage in the joint member, said tubular member extending outwardly through certain registering openings in the sleeve and casing, said certain openings in the casing and sleeve and the intake end of the passage through the rotatable joint member being vertically elongated, the length of the opening in the casing being greater than the length of the opening of the sleeve which is in registration therewith and the length of the other opening in the sleeve being less than the length of the opening at the intake end of the passage of said rotatable joint member.

3. A joint of the character described comprising a substantially T-shaped casing having an opening provided between the ends of the head portion thereof, a tubular joint member engaged with the shank portion of the casing and adapted for connection with a stationary pipe or conduit, means for rotatably joining said joint member and shank portion of the casing, a joint member rotatably mounted within the head portion of the casing and having a passage extending transversely therethrough between its ends, which passage is in registration at its ends with the shank portion of the casing and said opening in the casing, a sleeve having a working fit interiorly of the head portion of the casing and within which sleeve said rotatable joint member has a working fit, which sleeve is provided with openings on opposite sides thereof between its ends, one of which last named openings is in registration with the passage and opening in the casing and the other of which openings is in registration with the other end of the passage and the shank portion of the casing and a tubular member carried by the rotatable joint member with one end thereof in registration with the passage in the joint member, said tubular member extending outwardly through the registering openings in the sleeve and head of the casing, said rotatable joint member, sleeve and seat for the latter, being of frustro-conical form.

4. A joint of the character described comprising a substantially T-shaped casing having an opening provided between the ends of the head portion thereof, a tubular joint member engaged with the shank portion of the casing and adapted for connection with a stationary pipe or conduit, means for rotatably joining said joint member and shank portion of the casing, a joint member rotatably mounted within the head portion of the casing and having a passage extending transversely therethrough between its ends, which passage is in registration at its ends with the shank portion of the casing and said opening in the casing, a sleeve having a working fit interiorly of the head portion of the casing and within which sleeve said rotatable joint member has a working fit, which sleeve is provided with openings on opposite sides thereof between its ends, one of which last named openings is in registration with the passage and opening in the casing and the other of which openings is in registration with the other end of the passage and the shank portion of the casing, a tubular member carried by the rotatable joint member with one end thereof in registration with the passage in the joint member, said tubular member extending outwardly through the registering openings in the sleeve and head of the casing, said rotatable joint member, sleeve and seat for the latter, being of frustro-conical form and means at one end of the head of the casing for adjustably maintaining the frustro-conical members in properly seated position.

5. A swing joint of the character described comprising a casing, means for rotatably joining the casing with a pipe or conduit, said casing having a frustro-conical seat, there being an opening intermediate the ends of the frustro-conical seat, there being openings on opposite sides of the casing, a frustro-conical sleeve engaging against said frustro-conical seat, which sleeve is provided on opposite sides with openings registering with said openings in the casing, a frustro-conical joint member rotatable and having a working fit within the sleeve, which joint member is provided with a passage extending transversely therethrough, the ends of which passage register with the openings in opposite sides of the sleeve and a pipe carried by the rotatable joint member with one end thereof in registration with the passage through the joint member, which pipe extends outwardly through the registering openings of the sleeve and casing and is movable freely vertically within said registering openings.

6. A joint member of the character described comprising a casing having spaced openings therein, means for connecting a liquid delivery conduit with one of the openings of the casing, a joint member rotatably mounted within the casing and having a passage extending through it, which passage is in registration with said openings in the casing, a sleeve having a working fit interiorly of the casing and within which sleeve said rotatable joint member has a working fit, which sleeve is provided with openings on opposite sides thereof, which openings are in registration with the first named openings and a tubular member carried by the rotatable joint member with one end thereof in registration with the passage in the joint member, which tubular member extends outwardly through certain registering openings in the sleeve and casing.

WALLACE MACGREGOR.